May 30, 1944.   J. DAHL   2,350,151
OPTICAL FOCUSING SYSTEM
Filed June 27, 1940   2 Sheets-Sheet 1
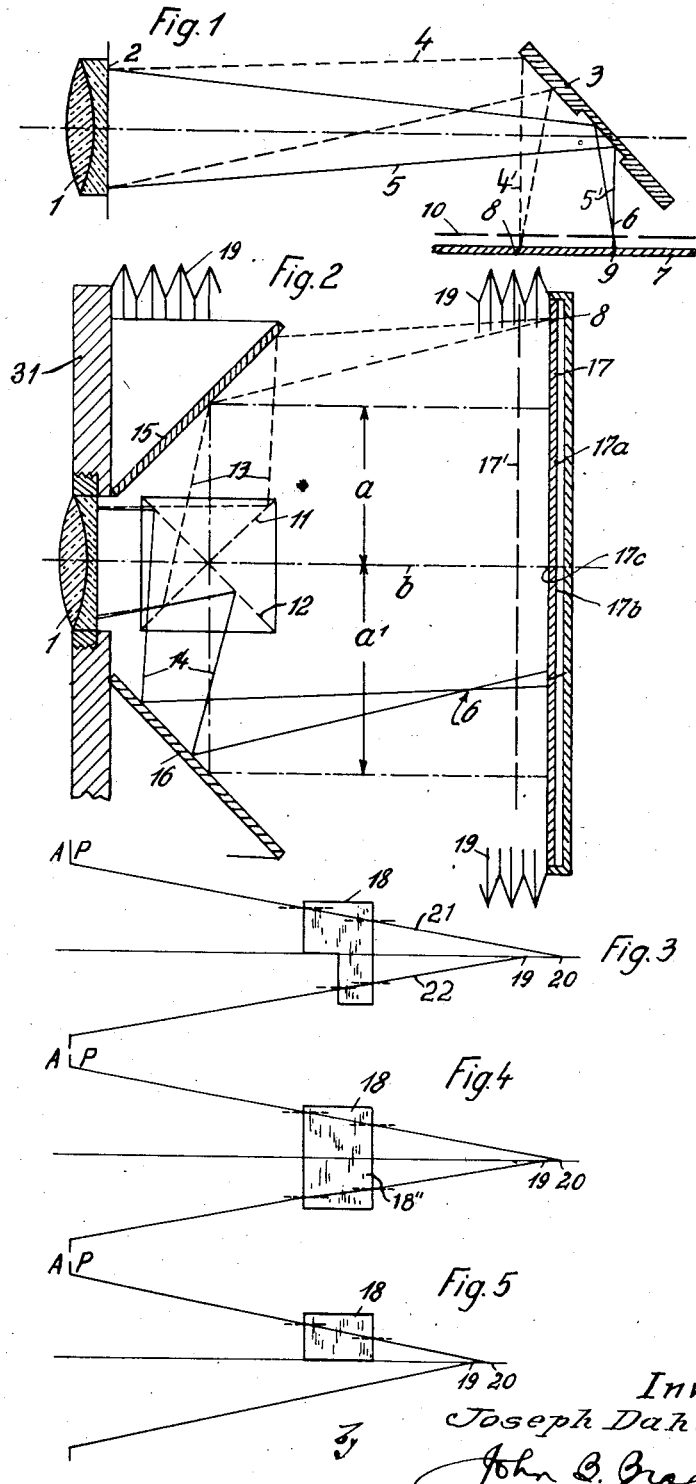
Inventor:
Joseph Dahl,
John B. Brody
Attorney

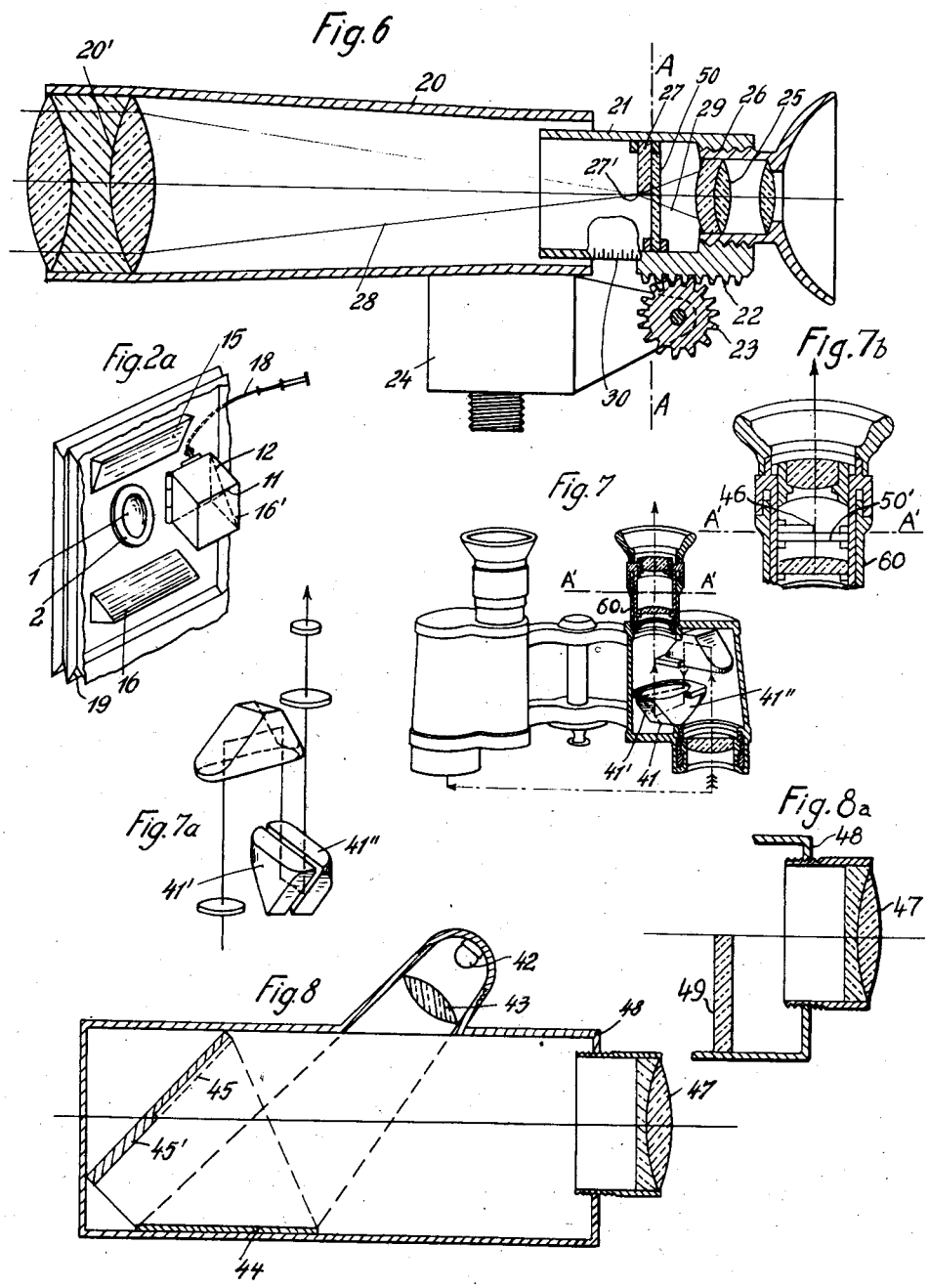

Patented May 30, 1944

2,350,151

UNITED STATES PATENT OFFICE 2,350,151

OPTICAL FOCUSING SYSTEM

Joseph Dahl, Schwerin, Germany; vested in the Alien Property Custodian

Application June 27, 1940, Serial No. 342,801
In Germany March 14, 1939

1 Claim. (Cl. 88—1)

This invention relates to an optical system for the focusing of real images, which may be intermediate images.

It is an object of the present invention to effect the focusing by comparison of at least two images or image portions.

It has been proposed already to compare such images, for instance, by producing on the focusing screen of a camera a plurality of more or less sharp images in succession, and to focus the camera in accordance with that image of the series which appears to be the clearest, as judged by the operator. Also, in my co-pending patent application Ser. No. 255,721, filed February 10, 1939, now Patent 2,286,471 issued June 16, 1942, it has been suggested already to produce the images in different planes and to compare said images or image portions as to their sharpness until they show the same sharpness; in this case, the plane of optimum sharpness is defined between the two planes of comparison.

It is an important object of the present invention to provide a very simple arrangement for achieving optimum sharpness in the focusing of images of the type referred to.

With this and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which:

Fig. 1 is a diagrammatic view of an arrangement having the invention applied thereto, employing mirrors.

Fig. 2 is a fragmentary, schematic, longitudinal section of a photographic camera having the invention applied thereto.

Fig. 2a is a perspective view of the front plate of said camera looking towards the back of the plate and showing the bellows partially broken away.

Fig. 3 is a diagrammatic view showing a modification in which plane parallel plates of different thickness are used.

Fig. 4 is a diagram showing a further modification, comprising glass plates having different refraction.

Fig. 5 is a diagram of still another modification.

Fig. 6 is an axial section of a distance meter or range finder having the invention applied thereto.

Fig. 7 is a perspective view, partly in section, of a field glass or binocular of the prism type, having the invention applied thereto.

Fig. 7a is a detail of Fig. 7.

Fig. 7b, a sectional view of an eye piece, shows a modified form of the device shown in Fig. 7.

Fig. 8 is a purely schematic longitudinal section of an episcope, having the invention applied thereto, and Fig. 8a shows a modified form of the episcope shown in Fig. 8.

Similar characters of reference denote similar parts in the different views.

The fundamental idea of the present invention consists in producing on a common plane real or virtual images or image portions corresponding to light paths of different length, for comparing said images or image portions as to their sharpness.

The optical system is then adjusted until the images or image portions show the same degree of sharpness, whereupon the setting is finished. In other words, I produce simultaneously images having different light paths, by optical means, in order to attain maximum accuracy of setting by comparison of said images, image portions or intermediate images.

The differential length of the light path from the exit pupil of the optical system producing the image to the projection plane or plane of the intermediate image for the images or image portions may be attained, for instance, by directing the light rays through a mirror or reflecting prism the reflecting surface of which is subdivided into at least two planes. Intercepting said images or image portions of different light paths, for instance, on a focusing screen, one of the two images or image portions will be sharply focused in a certain position of the intercepting plane, while the other image or image portion will be out of focus with respect to said plane. Again, with another position of the intercepting plane, reverse conditions will be prevailing with respect to the two images or image portions. Intermediate said two extremes of the intercepting plane there is only a single position of the said plane in which the two images or image portions show the same degree of sharpness, and in this position, the desired optimum sharpness of the image is obtained.

Similarly, where intermediate images are looked at, for instance, by means of an ocular, the optical system may be set to produce a similar impression as to the comparative sharpness of the intermediate images or image portions produced in somewhat staggered parallel planes.

The planes of the subdivided mirror or prism may be adjustable, so as to permit their use in connection with optical systems of different type. The planes of the reflecting system may be subdivided in various manners, for example, in the form of strips, of a chess-board, of concentric circles or the like. In order to simultaneously produce two identical images of the same object with different light paths, for comparison, a cross mirror may be used the two mirror surfaces of which are made to be semi-transparent.

According to a further feature of the invention, the differential light path may be produced by special optical means, for instance, by the provision of a subdivided plate having portions of different thickness, or of different index or refraction. Moreover, prisms of different index of refraction may be used instead of plates. Furthermore, it is contemplated that the mirror or reflection systems may consist partly or entirely of glasses having an optical filtering effect, for instance, of glasses producing special contrast effects.

Referring now to the drawings in greater detail, and first to Fig. 1, item 1 is the objective of an optical system the exit pupil of which is indicated at 2. Item 3 is a step mirror, or the reflecting surface of a step prism by which the particular effect is obtained in accordance with the gist of the present invention. It will be noted that owing to the stepped shape of the reflecting surface 3, travelling paths 4, 4' and 5, 5' of different length are provided for the light passing from the objective 1 and projected onto the plane 7 which may be a focusing screen or intermediate image plane. As a result, at least one image point, i. e., point 6 in the present example, falls outside said plane 7, or, in other words, a sharp image point 8 and a circle of dispersion 9 will appear on the plane 7.

Now, the setting has to be carried out in such a manner that the degrees of sharpness at 8 and 9 become equal, which will be the case in the plane of the circles of dispersion of equal size, namely, the measuring plane which is to be found.

It will be appreciated that there are various further practical possibilities for providing the required difference in the length of the light paths or for splitting up the images which are to be compared. Thus, for instance, instead of mere geometric differences of the distances, the mirrors and reflection systems may be optically different. Furthermore, combinations of geometric and optic differences may be used within the scope of the invention. For instance, the light paths of different length may be produced by a subdivided plate having portions of different thickness or different index of refraction, such systems being shown in Figs. 3 to 5.

Referring to Figures 3 to 5, the exit pupil of the objective is indicated at AP, while 18 is a plane parallel plate, items 19 and 20 are the relatively staggered image points and $n$, $n_1$, $n_2$ are the indices of refraction of the plate 18 or of the different portions of plate 18, respectively. The paths at which the light rays enter and leave the plate 18 and portions 18' and 18'', have been indicated by dash lines.

The operation of the system shown in these figures is as follows: According to Fig. 3, the lower portion of the plane parallel plate 18 is substantially thinner than the upper portion while the index of refraction $n$ is the same throughout the plate. It will thus be seen that while the upper and lower light rays 21 and 22 are deflected by the same angle owing to the angle of refraction of the glass, the total deflection of the two light rays is different in accordance with the different thicknesses of the upper and lower portions of the plate 18, whereby the image point 20 comes to lie at a point having a greater distance from the exit pupil AP than the image point 19.

In Fig. 4, the principle is similar, but the portions 18' and 18'' are of the same thickness while the indices of refraction $n_1$, $n_2$, of the two portions are different, whereby the angles of deflection become different and, as a result, the corresponding image points 19 and 20 are produced at different distances from the exit pupil AP.

A very simple practical form of the principle of Fig. 3 is illustrated in Fig. 5, showing a plane parallel plate 18 disposed in the course of the upper half of the pencil of rays only, whereby the same deflecting effect is produced as in Fig. 3.

Referring now to Figures 2, 2a and 6 to 8, showing some practical forms of the invention, and first to Figs. 2 and 2a, there are provided two transparent mirror surfaces 11 and 12 cooperating with mirrors 15 and 16 which are spaced, e. g., by different distances $a$ and $a_1$, respectively, from the axis $b$ of the cross mirror system. The rays 13, 14, passing from the two mirror surfaces 11 and 12 towards both sides will therefore have to travel through paths of different length and, in consequence, will produce sharp images in different planes, as indicated by the points 6 and 8. It is possible, however, by moving the common ground glass 17 into an intermediate plane between points 8 and 6, as indicated at 17', to obtain an image the two portions of which show exactly the same degree of sharpness, or, more precisely, of lack of sharpness. In this case, the plane 17' which on removal of the focusing screen or ground glass 17 represents the active surface of the photographic layer, is exactly in focus with respect to the non-deflected light rays, or, strictly speaking, a plane will be in focus spaced from plane 17a by a constant amount corresponding to the length of lateral deflection 13, or 14, respectively. Accordingly, in order to make the exposure, the cross mirrors 11, 12, which may be mounted in a frame 16' hingedly connected to the front plate 31 of the camera, in which the objective may be threadedly engaged, are swung out of the light path, into the position indicated in Fig. 2a. This may be effected by means of a Bowden control 18 passing to the outside through a light-tight bore in plate 17. The light-tight bellows of the camera is indicated at 19 and it will be understood that conventional means (not shown) are provided in the camera for adjusting the distance between objective 1 and focusing screen 17 in accordance with the comparative sharpness of the two images or image portions 17a and 17b at the bordering line 17c therebetween.

Instead of swinging the cross mirrors 11, 12 out of the light path, it is also contemplated that two parallel optical systems may be provided, after the manner of a mirror reflex camera, the cross mirrors 11, 12 being inserted in the finder system.

Thus fragmentary portions of pictures are compared and produced simultaneously by light rays of different lengths.

Referring now to Fig. 6, showing a range finder or distance meter, 20 is a tubular member in the left end of which the objective lens system 20' is mounted while in the right hand end, a second tubular member 21 is slidably seated for operation by a rack and pinion drive 22, 23, whose pinion 23 is secured on a base member 24 together with the tube 20. The ocular system 25 is mounted in a sleeve 26 threadedly engaged in member 21, so as to permit adaptation of the optical system to the special conditions of the eyes of the operator. A semi-circular or sector shaped plane parallel plate 27 is secured in the member 21, and advantageously in the intermediate plane A—A of the whole optical system, as indicated by the light rays 28, 29.

This device operates in accordance with the general principle illustrated in Figs. 3, 4 and 5, and especially in accordance with the latter figure, the plane parallel plate 27 corresponding to plate 18 of Fig. 5. Accordingly, as explained above, a focusing difference is produced and, in order to obtain optimum sharpness, the pinion 23 has to be operated until the upper and lower image portions show the same degree of sharpness at the dividing line, at the lower edge 27' of plate 27. In this case the point whose distance from the distance meter is to be measured is in focus and its distance may be read from the scale 30 in connection with a second scale provided at the operating knob (not shown) of the pinion 23. The rack and pinion mechanism and said scales are advantageously constructed similar to a micrometer, with high accuracy of the parts, so as to permit very accurate measurements.

The device shown in Fig. 6 may also be used as a telescope. In this case, the plate 27 also serves to facilitate accurate adjustment. Of course, theoretically, owing to the working principle producing a focusing difference, it is not possible to obtain simultaneously 100% sharpness of both image portions owing to the focusing difference between the two image portions produced by the plate 27. However, according to an important feature of the invention, it is possible to choose the conditions in such a manner that the remaining dispersion lies under the limit of perceptivity of the human eye, which is defined by the fact that the human eye is unable to perceive from a distance of 250 mms. two objects points spaced by less than 0.07 mm. In other words, the lower limit of perceptivity is 60". It follows that it is possible to provide a system in which the focusing difference and the dispersion due to the plane parallel plate or other differential member is less than 60" in case of a symmetrical focusing difference of the two image portions to be compared, so that there is no perceptible loss of sharpness at all, with respect to observation by the human eye, while the focusing difference and consequent dispersion is more than 60" in case of a non-symmetrical focusing difference of the two image portions. Therefore, in devices for direct observation, it is not necessary to withdraw the differential member from the light path.

Fig. 7 illustrates a prism binocular which as regards the arrangement of the optical system is of known type and, therefore, does not require detailed description, except that the prism 21 is composed of two portions 41' and 41" consisting of glasses of different angles of refraction (e. g., 41' may be flint glass and 41" crown glass, respectively), as best seen in Fig. 7a, showing the two adjacent halves drawn apart. In this manner, a differential length of the path of the light passing through the two prism portions may be provided, for the purpose set forth. By way of alternative, or in addition, a plane parallel plate may be inserted into the light path, as indicated at 46 and 50' in Fig. 7b, to form the differential member. The eye piece is shown at 60 in Figures 7 and 7b.

For adjustment purpose, it is preferable to provide for a cross hair in the plane A—A, Fig. 6, or plane A'—A', Fig. 7.

Fig. 8 is a diagram of an episcope comprising a source of light 42, a condenser 43, a picture 44 which is to be projected, a mirror 45 and a lens system 47. In order to focus this episcope, as by threading the lens system 47 in the casing 48, the normal plane mirror 45, indicated in dotted lines, may be replaced by a step mirror 45', whereby the effect explained with respect to Fig. 1 will be produced. Afterwards, the plane mirror 45 may be re-inserted, for the projection. By way of alternative, a removable plane parallel plate may be inserted at a suitable point in the course of the light rays, as indicated at 49 in Fig. 8a, in accordance with the arrangement of Fig. 5. It should be noted that the episcope system has been shown purely schematically to explain the manner in which my invention may be adapted to it, and various optical implements which are known by those skilled in the art to be required for operation of the episcope have been omitted for the sake of clarity.

Advantageously, instead of a plane parallel plate, a filter plate may be inserted in the course of the light rays for increasing the contrasts of the images and so to facilitate a comparison of the sharpness of the contours. A filter plate of this type has been indicated at 50 in Fig. 6 or at 50' in Fig. 7b, respectively, in dotted lines. Suitable types of filter glass are well known in the art.

The method and apparatus of the present invention have been described in detail with reference to specific embodiments. It is to be understood, however, that the invention is not limited by such specific reference, but is broader in scope and capable of other embodiments than those specifically described and illustrated in the drawings

I claim:

In an optical instrument having an objective for forming an image of an object and optical means whereby said image may be observed, said optical means being movable along the optical axis of said objective, the combination of means for dividing light transmitted from said object through said objective into two parts whereby to form two images of the object observable through said optical means, said dividing means comprising a transparent plate member having a thick portion and a thin portion provided with substantially plane parallel front and back faces and a plane face which is substantially normal to said front and back faces joining said thick and thin portions of said plate member, said plate member being positioned across the optical axis of the objective between the objective and the focal plane thereof with the front and back faces of the plate member substantially normal to the optical axis of the objective and the face joining the thick and thin portions of the plate member lying substantially on the optical axis whereby light emerging from the objective is caused to form two images which may be employed to determine when the objective is in focus with said object by moving said optical means until the optical means is located in a position wherein the two images of the object appear of similar sharpness.

JOSEPH DAHL.